United States Patent [19]
Hardin

[11] Patent Number: 6,003,120
[45] Date of Patent: Dec. 14, 1999

[54] METHOD AND APPARATUS FOR PERFORMING VARIABLE LENGTH PROCESSOR WRITE CYCLES

[75] Inventor: Jennefer S. Hardin, Orangevale, Calif.

[73] Assignee: Intel Corporation, Santa Clara, Calif.

[21] Appl. No.: 08/935,570

[22] Filed: Sep. 23, 1997

Related U.S. Application Data

[63] Continuation of application No. 08/756,515, Nov. 26, 1996, abandoned, which is a continuation of application No. 08/176,763, Dec. 30, 1993, abandoned.

[51] Int. Cl.⁶ .......................... G06F 12/00; G06F 12/04; G06F 9/38
[52] U.S. Cl. .......................... 711/169; 711/104; 711/118; 711/140; 711/154; 712/1; 712/200; 712/220
[58] Field of Search .................................... 395/342, 338; 711/101, 104, 118, 140, 154, 169; 712/1, 200, 220

[56] References Cited

U.S. PATENT DOCUMENTS

| | | | |
|---|---|---|---|
| 4,530,050 | 7/1985 | Fukunaga et al. | 395/375 |
| 4,598,359 | 7/1986 | Boothroyd et al. | 395/421.04 |
| 4,994,962 | 2/1991 | Mageau et al. | 395/403 |
| 5,073,851 | 12/1991 | Masterson et al. | 395/467 |
| 5,148,528 | 9/1992 | Fite et al. | 395/375 |
| 5,163,140 | 11/1992 | Stiles et al. | 395/467 |
| 5,167,026 | 11/1992 | Murray et al. | 395/375 |
| 5,222,223 | 6/1993 | Webb, Jr. et al. | 395/467 |
| 5,257,362 | 10/1993 | Menon | 395/441 |
| 5,265,236 | 11/1993 | Mehring et al. | 395/413 |
| 5,303,364 | 4/1994 | Mayer et al. | 395/467 |
| 5,353,431 | 10/1994 | Doyle et al. | 395/416 |
| 5,359,722 | 10/1994 | Chan et al. | 395/432 |
| 5,367,705 | 11/1994 | Sites et al. | 395/800 |
| 5,396,608 | 3/1995 | Garde | 395/410 |
| 5,416,739 | 5/1995 | Wong | 365/189.01 |
| 5,420,824 | 5/1995 | Kajimoto et al. | 365/230.01 |
| 5,471,598 | 11/1995 | Quattromani et al. | 395/449 |

*Primary Examiner*—Tuan V. Thai
*Attorney, Agent, or Firm*—Blakely, Sokoloff, Taylor & Zafman

[57] ABSTRACT

A computer system comprising a processor, a memory subsystem having a fast memory and a slow memory, and other at least one peripheral-performing variable length processor write cycles is described. The present invention includes a method and apparatus for generating signals to indicate write cycles to either a fast memory or a slow memory. The present invention also includes a method of generating signals to indicate the initiation of write cycle to a slow memory and avoiding the insertion of unnecessary wait states in write cycles to memory. The present invention further includes a method of minimizing wait states in a write cycle to memory. The computer system further includes a memory controller having a control flag signal to indicate a write to slow memory when asserted, and to indicate a write to a fast memory when deasserted. The control flag signal when asserted memory system includes a programmable address decoder having a writable memory which provides bank address signals.

4 Claims, 10 Drawing Sheets

METHOD AND APPARATUS FOR PERFORMING VARIABLE LENGTH PROCESSOR WRITE CYCLES

This is a continuation of application Ser. No. 08/756,515, filed Nov. 26, 1996, now abandoned, which is a continuation of application Ser. No. 08/176,763, filed Dec. 30, 1993, now abandoned.

BACKGROUND OF THE INVENTION

1. Field of the Invention

This invention relates to the field of computer systems. More specifically this invention relates to write cycles performed in a computer system.

2. Related Art

A computer system typically comprises a processor, a bus, memory, and other peripheral devices. The processor is responsible for executing instructions using the data in the computer system. The bus serves as a communication pathway between the processor and the other devices for transferring information between one another. The memory subsystem stores data and instructions for the processor and other resources of the computer system. A memory controller controls access by the processor and other devices to the memory devices in the memory subsystem.

In many prior art systems, the overall system performance is linked to the performance of the memory subsystem. To realize the performance potential of many prior art processors, a prior art system must use relatively fast memory devices. However, because of the cost of fast memory devices, some prior art systems are not able to use only fast memory devices, such that performance does not reach its potential.

To resolve the cost-performance tradeoff, prior art systems partition system functions by using a combination of fast and slow memory devices. If the most frequently used functions are stored on the fast memory device, all the other functions are stored on the slow memory device. One prior art memory configuration uses Dynamic Random Access Memory (DRAM) devices which are slow but cheap for slow memory, and Static Random Access Memory (SRAM) devices which are more expensive, yet faster, for fast memory.

Prior art computer systems typically include a memory controller for controlling access to the memory devices. Although various types of memory may be installed in the computer system, the memory controller must be configured to correctly access both fast and slow memory without unnecessarily wasting processor resources.

The peripherals in a computer system communicate to the processor via a host or system bus. The bus cycle for the processor is the period of time taken to send an address on the system bus from the processor to memory and to transfer data between the memory and the processor. The bus cycle is typically measured in clock cycles. For example, it can take the processor three clock cycles to send an address to memory and two clock cycles to receive data from memory. The number of clocks for each operation determines the bus cycle length. The functional operation of the bus and the bus cycle length used (herein referred to as cycle length) when the processor is accessing other peripherals in the computer system depends on the parameters established for the particular bus and the bus controller used by it to control access to the bus. Fast memory devices coupled to the memory controller can communicate to the processor at shorter bus cycle lengths while slow memory devices require longer cycle lengths.

FIG. 1 illustrates a prior art system having a processor 12 for executing data and instructions. Processor 12 is coupled to local bus 10. Local bus 10 provides a communication pathway between processor 12 and other peripherals of the computer system. Processor 12 also transfers data to the memory devices.

Bus control unit (BCU) 14 manages communications between peripherals 20 on the system bus 22 and processor 12 via the local bus 10. Memory controller 16 is shown coupled to system bus 22. Memory controller 16 manages communications between processor 12 and memory device 18. Memory device 18 is coupled to memory controller 16 and it is used to store data and information in the computer system.

A write cycle to memory typically begins with processor 12 driving an address on local bus 10. A write signal is sent to memory device 18 via BCU 14 and memory controller 16. BCU 14 manages the communication of the address signals from processor 12 on the local bus 10 and system bus 22. The memory controller 16 controls the access to memory device 18 according to the memory destination specified in the address generated by processor 12. The time taken to write to the memory location specified by the address generated by processor 12 is known as a write cycle.

Many prior art processors in order to perform a write operation to both slow and fast memory devices insert wait states in their write cycles. Wait states are additional bus cycles which extend the time (number of clock cycles) required to perform a write cycle operation. Wait states are inserted in order to allow enough time to complete the write cycle.

During wait states, the processor is typically idle. This wastes the processor resources and directly affects the efficiency of the prior art computer system. Since the processor could be performing other instructions instead of being in an idle state waiting for a write cycle to complete, the addition of extra clocks to complete a write cycle impedes the processor's potential performance, thereby affecting the performance of a computer system.

The extended time required to perform writes to slow memory devices with inserted wait states has proved unacceptable to many system designers. To improve prior art system performance and still accommodate slow memory devices, several techniques are being used. One such technique is the pipelining of bus cycles. Pipelining is a processor instruction fetches, decoding, and execution overlapping technique to maximize processor throughput and bus utilization. Pipelining allows the overlapping of bus cycles to decrease the amount of time for the memory to respond to processor requests. Pipelining also decreases the address access time by one or more clock cycles for the processor. So for example, if a non-pipelined write cycle to memory has three wait states, pipelining such a write cycle will decrease the number of wait states to two.

FIG. 2 illustrates an example of a pipelined write cycle of the prior art system. Referring to FIG. 2, the clocks are labelled 1–6 and the signals are labelled with a "#" to indicate that a signal is low when asserted (i.e., active low). In clock 1, processor 12 initiates a write cycle by asserting address strobe (ADS#) signal 200 and driving an address on the address bus. In clock 3, the next address (NA# 220) signal is asserted. Because the first write cycle (cycle 1) has not yet completed, the next address is not driven until clock 5 when address strobe (ADS#) signal 200 is asserted to start the next write cycle (cycle 2). The memory controller of the prior art system waits until clock 3 to assert next address (NA#) signal 220 because it assumes the first cycle (cycle 1) is going to slow memory (even if the cycle is really to fast memory) thereby slowing the computer system down.

Although pipelining helps prior art processors increase their performance, the performance is less than the potential performance of some advanced processors. The higher clock frequencies and fast memory cycle times supported by these advanced processors often force the insertion of unnecessary wait states during write cycles to fast memory devices in the prior art systems. The unnecessary wait states are included because the decision to insert wait states is made before any determination is made as to whether the write cycle is directed to a fast or slow memory device. Thus, prior art systems include wait states in write cycles to both fast and slow memories. It is desirable to have a computer system that includes wait states when they are needed and to not include wait states when they are not required.

The present invention provides for performing write operations in a computer system to both fast and slow memories. The present invention causes wait states to be inserted in the write cycles in order to compensate for slow memory devices and not for fast memory devices. Thus, the present invention uses variable length write cycles when performing write operations.

SUMMARY OF THE INVENTION

A method and apparatus for performing variable length write cycles to memory in a computer system is described the currently preferred embodiment, the present invention includes a processor for processing instructions and memory for storing the instructions to a plurality of memory locations. The present invention also includes a memory controller for controlling access to memory.

One embodiment of the present invention also includes a flag signal generated by the memory controller. The flag signal determines whether an address should be generated by the memory controller to either slow or fast memory. The assertion of the flag signal by the memory controller also enables the memory controller to latch a copy of address generated by the processor to slow memory. By latching address to slow memory, the present invention is able to avoid the unnecessary insertion of wait states in write cycles to memory.

DETAILED DESCRIPTION OF THE PRESENT INVENTION

The present invention provides a method and apparatus for performing variable length write cycles in a computer system. In the following description, numerous specific details are set forth in order to provide a thorough understanding of the present invention. However, it will be apparent to one of ordinary skill in the art that these specific details need not be used to practice the present invention. In other instances, well known structures, circuits, and interfaces have not been shown in detail in order not to unnecessarily obscure the present invention.

Figure 1:
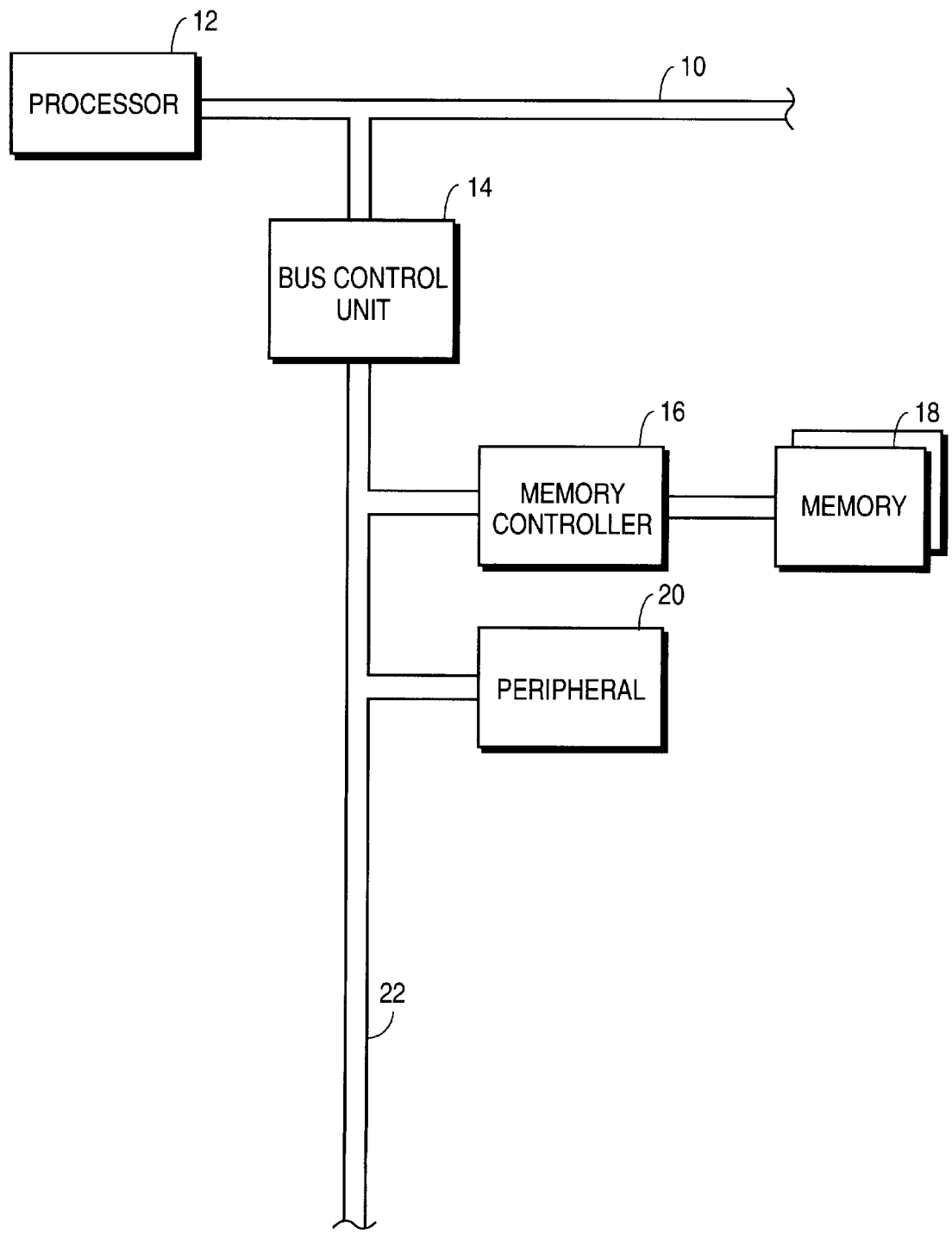
FIG. 1 is a block diagram of a prior art computer system.
Figure 2:
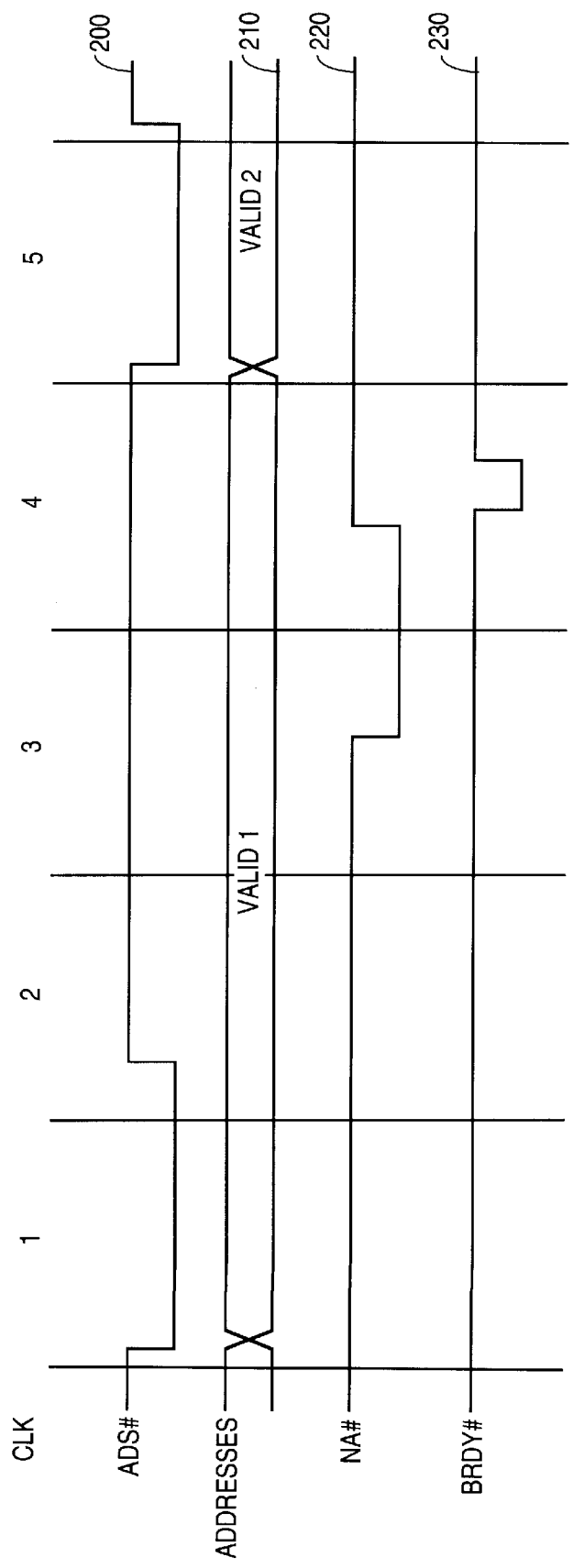
FIG. 2 is a block diagram of a pipelined write cycle of a prior art system
Figure 3:
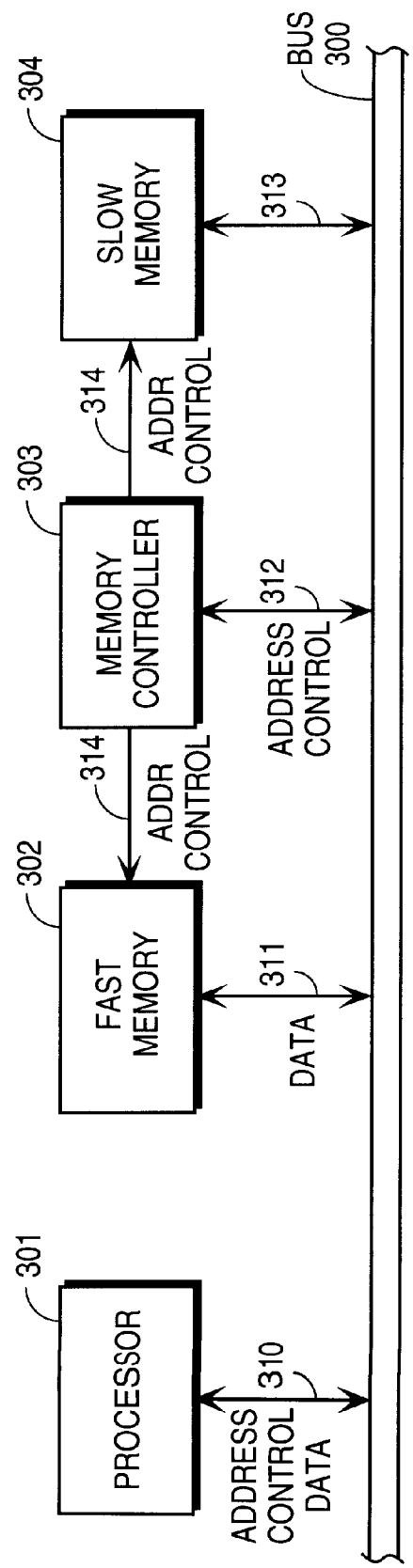
FIG. 3 is a block diagram of a computer system of the present invention.

Referring first to FIG. 3, an overview of a computer system of the present invention is shown in block diagram form. It will be understood that while FIG. 3 is useful for providing an overall description of the computer system of the present invention, a number of details of the system are not shown to avoid unnecessarily obscuring the present invention. As necessary for disclosure of the present invention, further details are set forth with reference to other figures provided with this specification. Further, the present invention is described with reference to its preferred embodiment, alternative embodiments which may be conceived by one of ordinary skill in the art are considered within the scope of the claims set forth.

As illustrated in FIG. 3, a computer system, as may be utilized by the preferred embodiment of the present invention, generally comprises a bus 300 for communicating information, a processor 301 coupled with the bus 300 for processing information, memory 302 and 304 coupled with the bus 300 for storing information and instructions for processor 301, and memory controller 303 coupled with bus 300 for controlling memory access to memory 302 and 304 by processor 301 or other devices coupled to bus 300. Processor 301 is coupled to bus 300 via lines 310 which include address, data and control lines. Main memory 302 is coupled to bus 300 via lines 311 which comprise data lines. Memory controller 303 is coupled to bus 300 via lines 312 which comprise address and control lines. Memory controller 303 is further coupled to main memory 302 via lines 314 which are comprised of address and control lines. The computer system also includes a slow memory device 304 coupled to bus 300 via line 313 also for storing of data and information.

In a normal mode of operation, processor 301 applies an address and control signals to bus 300 via lines 310. Memory controller 303 receives the address and control signals from bus 300 via lines 312. Depending on the specified address and control signals, memory controller 303 applies memory access control signals to either fast memory 302 or slow memory 304. On receipt of the memory access control signals from memory controller 303, data is transferred via data lines 311 to fast memory 302 or via lines 313 to slow memory 304 from bus 300 for a write operation, or data is transferred from fast memory 302 or slow memory 304 onto bus 300 via data lines 311 and 313 respectively for a read operation. Data is read or written by processor 301 using lines 310 and bus 300. Similarly, other devices may access fast memory 302 and slow memory 304 using bus 300. These other peripheral devices have not been shown to avoid obscuring the present invention.

Figure 4A:
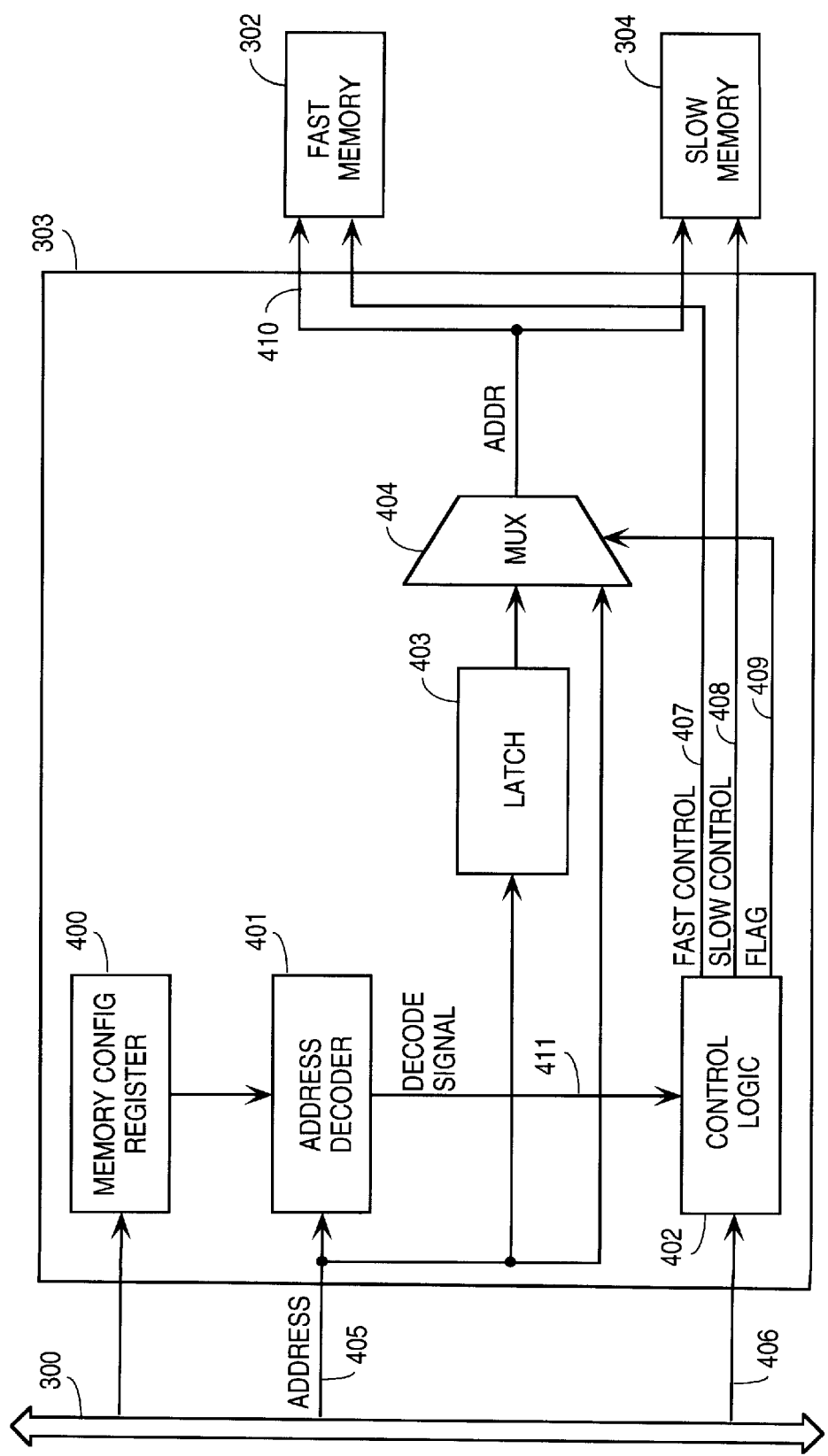
FIG. 4A is a block diagram of the memory controller of the present invention.

FIG. 4A is a diagram illustrating one embodiment of the internal architecture of the memory controller 303 of the present invention. The components of memory controller 303 and their operation are well known in the art, with the exception of the control logic which has been modified to support the present invention. The control logic selects the address to be generated to either slow or fast memory of the present invention. This allows separate write operations to both fast and slow memory devices to have variable lengths.

Referring to FIG. 4A, the memory controller 303 comprises a memory configuration register 400, an address decoder 401 coupled to the memory configuration register 400, a control logic 402 coupled to the address decoder 401 via address signal line 411, a latch 403, and a multiplexor (mux) 404 coupled to the latch 403.

The memory configuration register 400 stores information related to memory devices installed in fast memory 302 and slow memory 304 such as the address range of these memories, number of clocks for either write or read accesses to fast memory 304 and slow memory 302, etc. The address decoder 401 is coupled with memory configuration register 400 via address line 421. Address decoder 401 includes circuitry for converting addresses generated by processor 301 for memory controller 303.

The decode signal 411 is generated by address decoder 401 after decoding an address generated by the processor 301. In an access to fast memory 302, the address signal is sampled at the clock edge while in a slow memory access, the address is required to remain valid throughout the access. An address signal from processor 301 is latched by latch 403 along with the address generated by the processor 301.

The latch 403 is coupled to mux 404 and maintains the address generated by the processor 301 for the duration of a bus cycle. Two addresses may be present in the system at once. The address for the next bus cycle may appear on address lines 405 before the current cycle ends. This typically happens when the memory controller 303 is still servicing either fast memory 302 or slow memory 304 when the processor 301 generates another address to initiate another write cycle. By latching addresses, the present invention is able to pipeline write cycles to the different types of memory.

Address signals generated by processor 301 and a latched address are coupled to the inputs of mux 404. The mux 404 outputs either the latched address or the address directly from processor 301 to the selected memory location. The decode signal 411 from address decoder 401 is also coupled to memory control logic 402 to set the correct number of wait states for the accessed memory devices based on information stored in the configuration register 400 for fast memory 302 and slow memory 304.

The control logic 402 comprises logic that generates fast control signal 407 and slow control signal 408 in response to control signals 406 from processor 301 to both fast memory 302 and slow memory 304 respectively. The control logic 402 also generates a flag signal 409. When asserted, flag signal 409 indicates a write to slow memory 304 and when deasserted indicates a write to fast memory 302. The memory controller 303 causes mux 404 to multiplex a latched copy of a write cycle address generated by processor 301 if a prior write cycle has not completed. Using wait state information from the memory configuration register 400, the memory controller 303 then inserts wait states for write cycles to fast memory 304. The latching of a copy of an address by the latch 403 causes the rest of the memory sub-system to delay servicing the current write cycle until the previous cycle has completed. When the flag signal 409 is deasserted, the memory system does not insert wait states in a write cycle for fast memory 302, thereby preventing the processor 301 from being idle while a write is completed to fast memory 302.

Figure 4B:
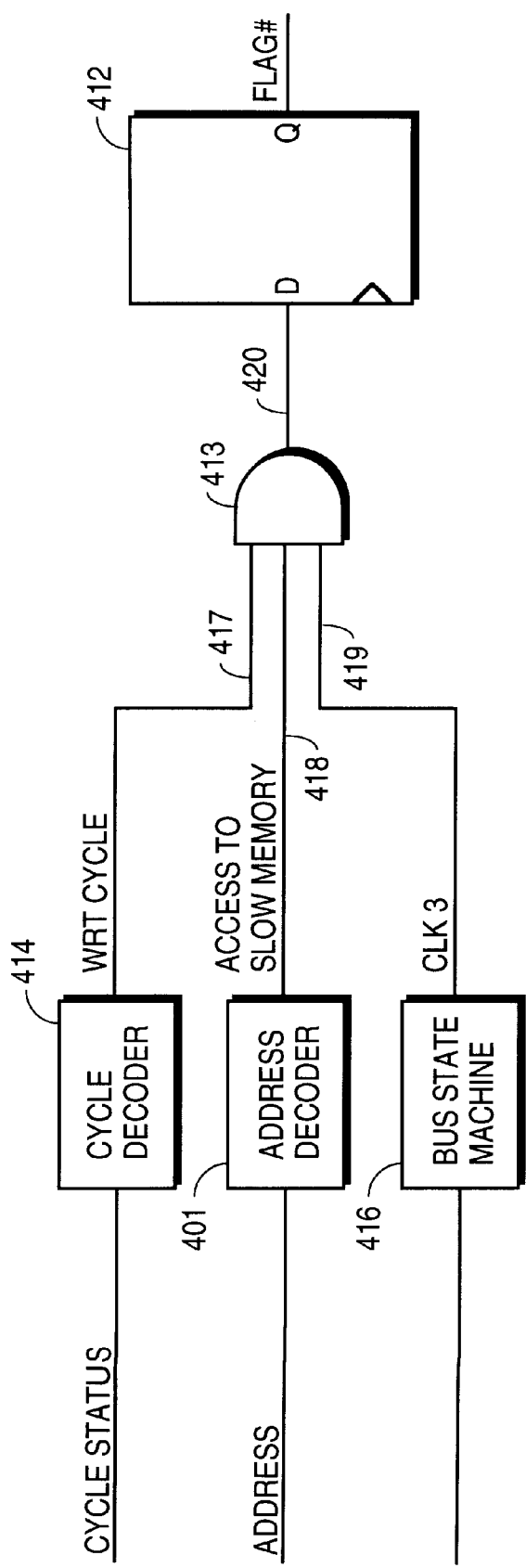
FIG. 4B is a block diagram of the control flag signal logic of the present invention.

FIG. 4B illustrates one embodiment of the flag signal logic. Referring to FIG. 4B, flag logic 409 comprises a D flip-flop 412, AND gate 413 coupled to the D flip-flop 412 via output signal line 420, a cycle decoder 414 coupled to the AND gate 413 via the write cycle line 417, an address decoder 401 coupled to the AND gate 413 via the access to slow memory line 418, and a bus state machine 416 coupled to the AND gate 413 via the clock 3 signal line 419.

Cycle decoder 414 decodes cycles initiated by processor 301. In one embodiment of the present invention, if the cycle status is a logical 1, then the cycle is decoded as a write cycle by cycle decoder 414.

The address decoder 401 decodes addresses generated by processor 301. If the address falls within an address range specified in the memory configuration register 400 for slow memory 304, the address decoder 401 generates a "1" bit signal to one of the inputs of AND gate 413. If the address decoder 401 generates a "0" bit signal, indicating that the write cycle is to fast memory 302.

Bus state machine 416 transitions between multiple states as the present invention completes write cycles. The bus state machine 416 transitions in three clocks from the initial or first state to the end state when a write operation is initiated to slow memory 304. The bus state machine transitions in two clocks from the initial state to the end state in when a write operation is initiated to fast memory 302. If a write cycle is to slow memory 304, the bus state machine 416 asserts signal 419 which is coupled to another input of the AND gate 413.

AND gate 413 receives the outputs from the cycle decoder 414, address decoder 415 and the bus state machine 416 and outputs signal 420 that is coupled to the D input of flip-flop 412. The output signal 420 is low when the inputs to the AND gate 413 do not meet the following conditions: a write cycle to slow memory 304 is decoded by the address decoder 401, a write cycle access to slow memory 302 is decoded by the cycle decoder 414, and a transition of the bus state machine occurs in 3 clocks. Flip-flop 412 asserts a high flag signal 409 through its Q output to mux 404.

Figure 5:
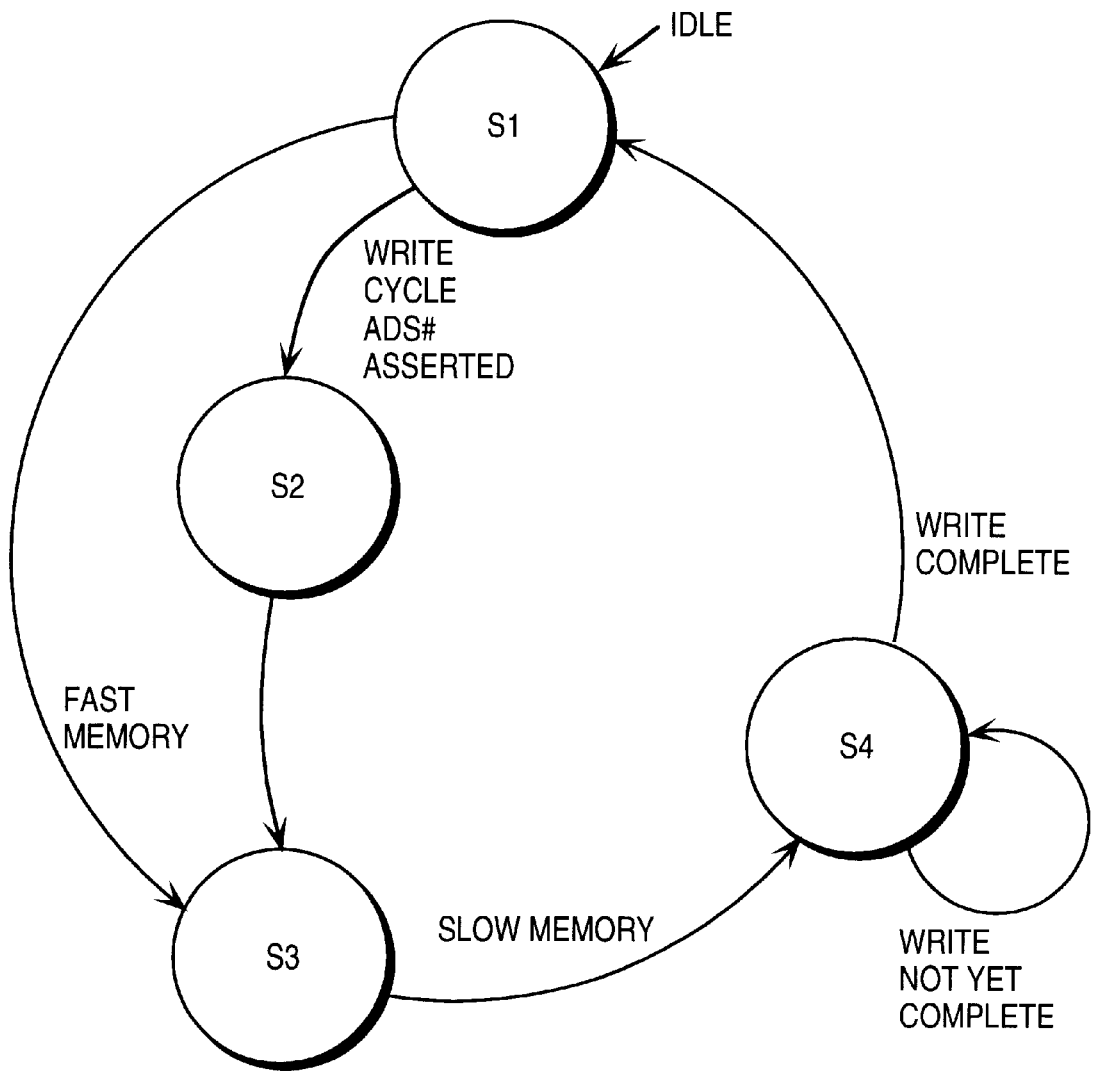
FIG. 5 illustrates a bus state machine of the present invention.

FIG. 5 is a transition state diagram depicting the bus state machine of the present invention. In the preferred embodiment of the present invention, four states are included to generate two write bus cycles, a slow bus cycle to a slow memory and a fast bus cycle to a fast memory. A transition logic in the state machine uses access information stored in the configuration register 400 to determine accesses to either fast memory 304 or slow memory 302.

State 1 (S1) corresponds to the idle state of the state machine. When in state S1, memory controller 303 has the ready signal (BRDY#) 230, the next address signal (NA#) 220, and the flag signal (Flag) 409 all deasserted. The bus state machine 416 transitions to state 2 (S2) when a write cycle is initiated by processor 301. An address (originating from processor 301) is sent to either fast memory 302 or slow memory 304 via mux 404. The assertion of the address strobe signal 200 on bus 300 by processor 301 initiates state 2 (S2).

Once in state S2, the memory controller 303 asserts the NA# signal 220 to instruct the processor 301 to implement its pipelined capabilities and generate the address for the next cycle. During state S2, the BRDY# signal 230 and the Flag signal 409 are still deasserted. The bus state machine then transitions to state S3 in the next clock.

In state S3, the BRDY# signal 230 is asserted by memory controller 303 to indicate to the processor 301 that the write cycle is completed. The NA# signal 220 is deasserted and flag signal 409 remains deasserted. The bus state machine transitions back to state S1 if the write is to fast memory 302, thus completing the write cycle without inserting any unnecessary wait states.

The bus state machine transitions to state S4 if the write is to slow memory 304. In state S4, the NA# signal 220 and the BRDY# signal 230 are deasserted. The memory controller 303 then applies a latched copy of the write cycle address to slow memory 304 and asserts Flag signal 409 to indicate that the next cycle is to be delayed by a single clock by inserting a wait state into the cycle.

In the present invention, the state machine, using information in the configuration register 400, can remain in the fourth state for multiple clocks if slow memory 304 requires more than an extra clock to complete a write cycle. After the write cycle completes, the state machine transitions back to state S1 until processor 301 asserts address strobe (ADS#) signal 200 to indicate the start of a new cycle.

Therefore, the present invention lengthens write cycles to slow memory by inserting wait states until the write is fully completed by a slow memory device. However, the cycle appears to the processor 301 to be without wait states, since BRDY# signal 230 is asserted to the processor 301 in state S3 regardless of whether the write cycle is directed to fast memory 302 or slow memory 304.

Figure 6:
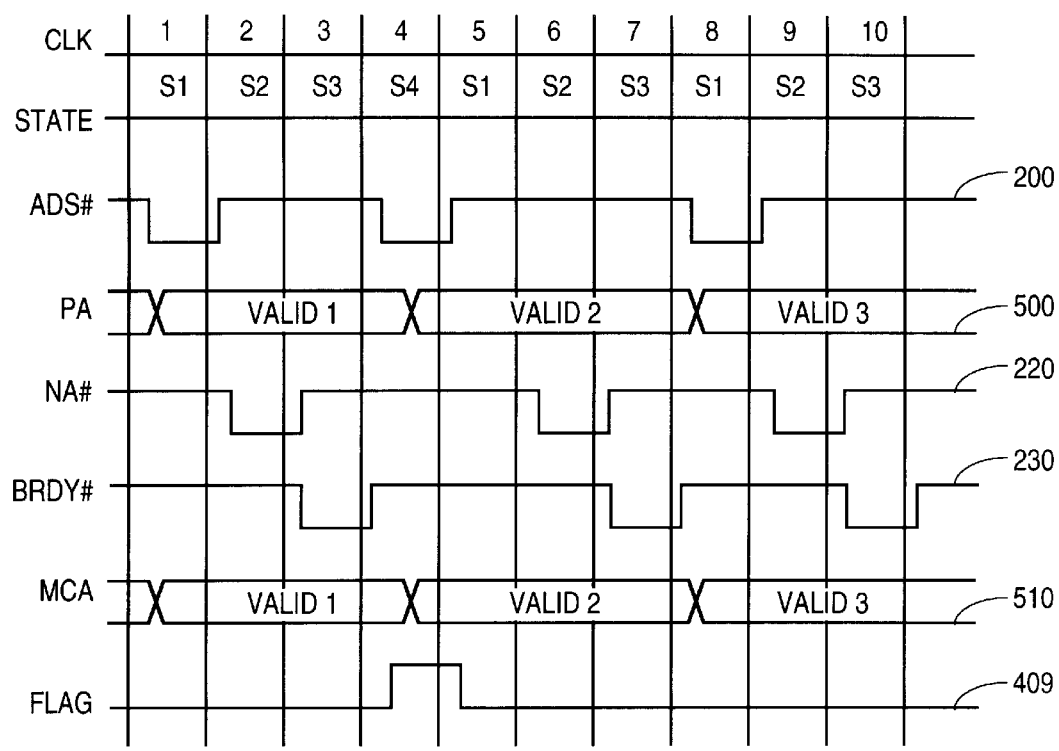
FIG. 6 illustrates a pipelined write cycle of the present invention.

FIG. 6 is a timing diagram of a preferred embodiment of the present invention, illustrating pipelined address write cycles of the present invention. A memory controller of the preferred embodiment of the present invention allows a write cycle to complete in three clocks when writing to fast memory 302 while ensuring that write cycles to slow memory 304 have enough time to complete. Pipelining allows the present invention to overlap writes cycles to slow memory 304 and fast memory 302. The assertion of the next address (NA#) signal 220 indicates a request for pipelining in the present invention. NA# signal 220 is generated by logic in memory controller 303 of the present invention. When asserted, it signals the processor 301 to generate an address to initiate the next write cycle on the local bus 300 since the address for the previous cycle has already being used and, thus, is no longer needed.

Two address phases are illustrated in FIG. 6, processor address phase (PA) 500, which is the address driven by processor 301 on bus 300, and memory controller address phase (MCA) 510, which is the address driven by memory controller 303 on bus 300 to either slow memory 302 or fast memory 304.

Referring to FIG. 6, the first cycle (cycle A) accesses slow memory 304. At clock one, processor 301 initiates the cycle by driving an address on the address bus and asserting the ADS# signal 200 (i.e. an active low). At clock 2, memory controller 103 asserts the NA# signal 220 to indicate to processor 301 that it no longer needs the address for cycle A. During clock 2, memory controller 303 has not yet decoded whether the write cycle is for fast memory or slow memory.

At clock 3, memory controller 303 asserts the BRDY# signal 230 to indicate that the write cycle is complete. In response to the NA# signal 220 and the BRDY# signal 230 being asserted, processor 301 completes driving VALID1 address and begins driving VALID2 address for cycle 2 (cycle B) on bus 300 in clock 3.

In clock 3, memory controller 303 also completes a decode of cycle A, and determines that the write cycle is to slow memory 304. The memory controller 303 then asserts the flag signal 409 and latches a copy of VALID1 address.

The assertion of the flag signal 409 and the latching of VALID1 address by the memory controller 303 effectively lengthens cycle A to four clocks by inserting a wait state inside memory controller 303. This is because VALID1 address is still being decoded in the memory controller 303 due to the write to slow memory 304 (i.e. address for slow memory is sampled throughout the access). The latched copy of VALID1 address is driven to slow memory 304 during clock 4. In the middle of clock 4, the processor 301 completes driving VALID1 address to complete the first write cycle for the processor 301.

At clock 5, the flag signal 409 is deasserted and VALID2 address for cycle B is driven to the memory controller 303. Since cycle B is a write to fast memory (since the processor assumes all writes are to fast memory), and the memory controller 303 decodes it to be such, cycle B takes three clocks to complete.

The latching of VALID1 address after VALID2 address has been driven onto bus 300 by the processor 301 essentially enables the memory subsystem to service cycle A in a variable number of clock cycles, depending on what type of memory is being written to. Thus, despite cycle B having already been pipelined onto bus 300, and cycle A appearing to take only three clocks to the processor 301, cycle A actually continues for another clock to slow memory 304.

Figure 7:
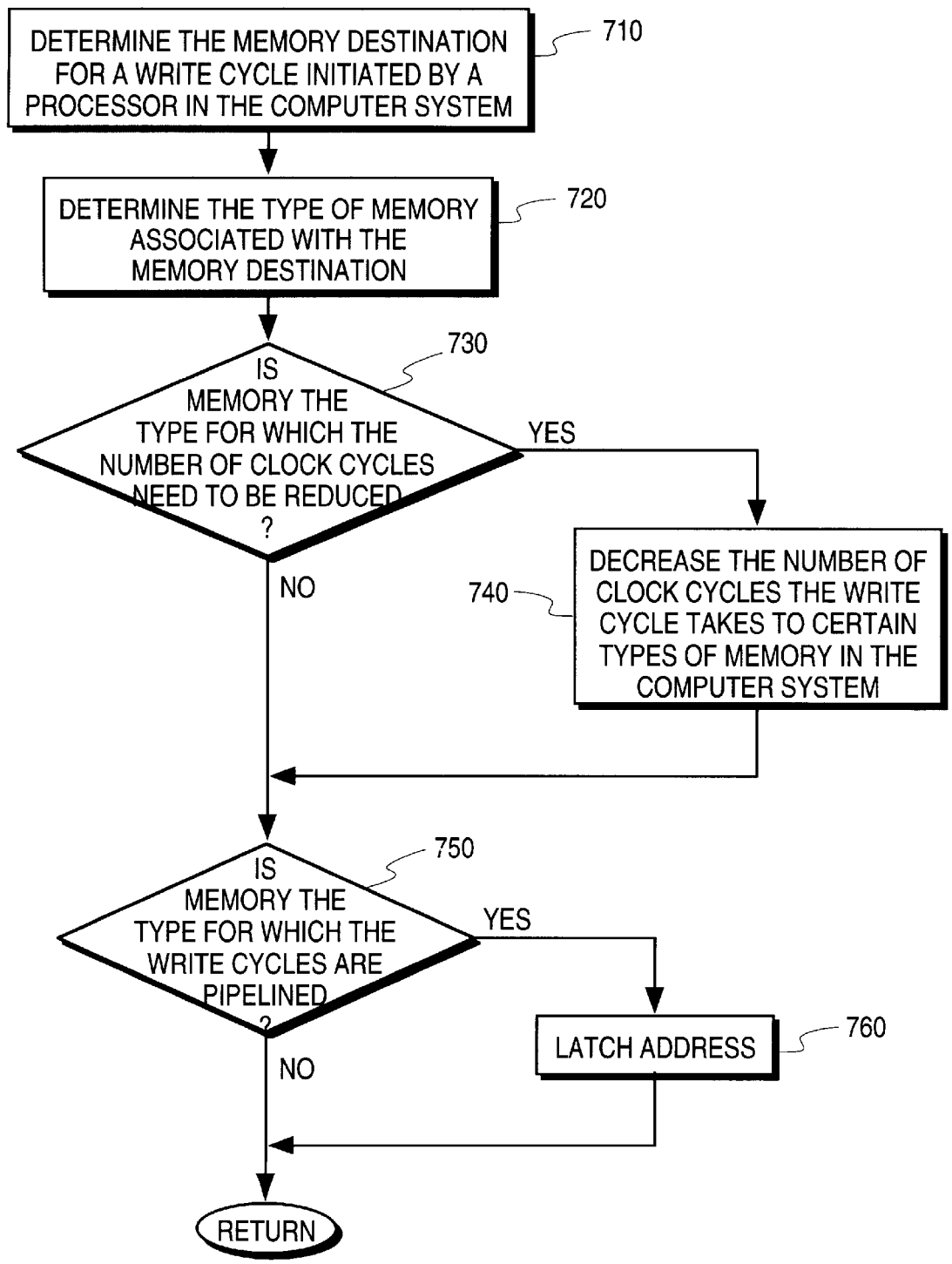
FIG. 7 illustrates a first method of implementing the present invention.

Referring now to FIG. 7, a first means of implementing the present invention is illustrated. As shown in FIG. 7, the embodiment of the present invention performs variable length write cycles by first determining the memory destination of the indicated write cycle, the write cycle being initiated by a processor within the computer system. After determining the memory destination, the present invention then decreases the number of clock cycles required by the write cycle for some memory types, but not for other memory types, within the computer system. Finally, the present latches the address meant for certain types of memory, such that write cycles initiated by the processor are pipelined.

Figure 8:
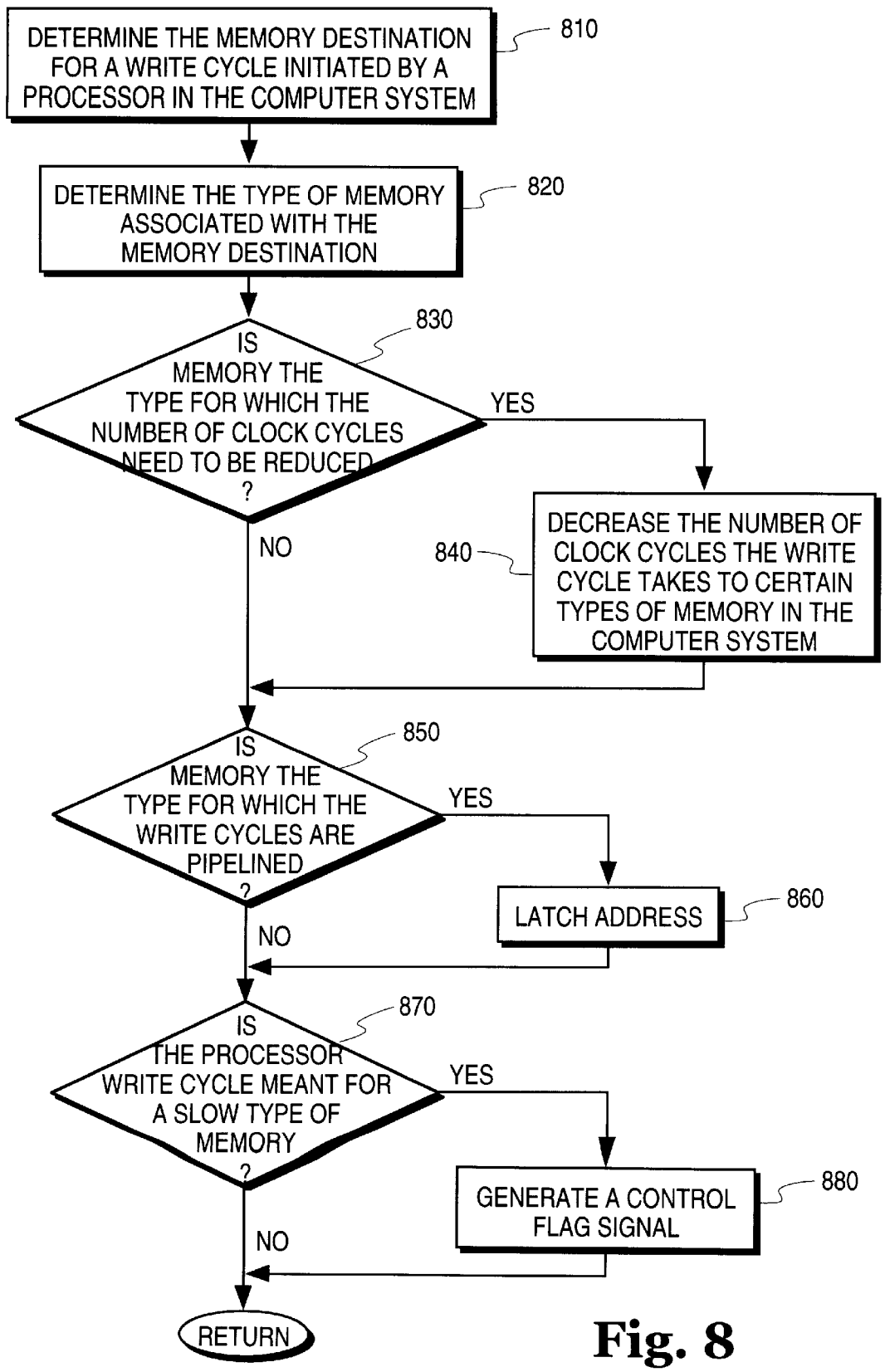
FIG. 8 illustrates a second method of implementing the present invention.

Referring now to FIG. 8, a second method of implementing the present invention is illustrated. Similar to the first method, the second method further generates a control flag signal when the processor write cycle is meant for the slower type of memory.

Figure 9:
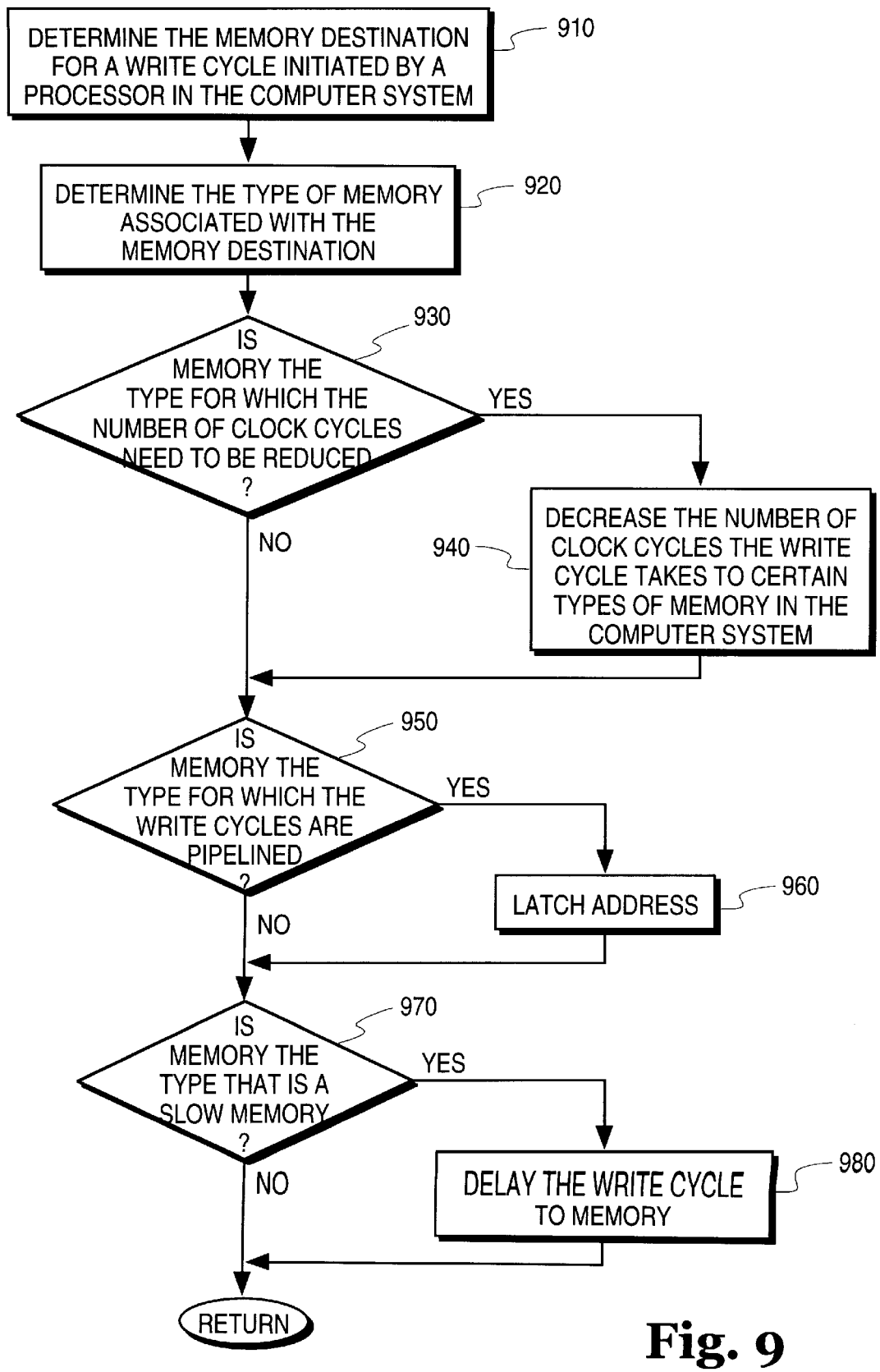
FIG. 9 illustrates a third method of implementing the present invention.

Referring now to FIG. 9, a third method of implementing the present invention is illustrated. The third method, shown in FIG. 9, adds to the first method only the further step of latching address signals generated by the processor in order to delay write cycles intended to particular types of memory.

Although the present invention has been described herein with reference to a specific preferred embodiment, many modifications and variations therein will readily occur to those skilled in the art. Accordingly, all such variations and modifications are included within the intended within the intended scope of the present invention as defined by the following claims.

What is claimed is:

1. An apparatus comprising:

a processor connected to a system bus;

a slow memory and a fast memory connected to said system bus;

a memory configuration register storing fast and slow memory address space and operating parameters;

an address decoder for supplying an output signal indicative of an access to said fast memory or said slow memory in response to parameters in said memory configuration register and a memory address supplied from said system bus;

a latch for receiving addresses to said fast memory and said slow memory from said system bus and providing a latched output of a received address for the duration of a bus cycle;

a multiplexor receiving the output address of said latch and an address from said processor and a control logic output signal that determines which received address is supplied to said multiplexor output, said multiplexor output for addressing said fast memory and said slow memory;

control logic receiving control signals from said processor indicative of a write to memory and receiving the output signal from said address decoder and supplying control logic output signal to said multiplexor for causing said multiplexor to output said latched address for at least one clock cycle when said control logic receives a write cycle signal and an access to slow memory signal;

wherein said processor has a pipelined architecture and includes means for asserting a next address signal to said processor two clock cycles after commencement of a memory write cycle.

2. An apparatus comprising:

a processor connected to a system bus;

a slow memory and a fast memory connected to said system bus, said fast memory requiring a first number of clock cycles to complete a write cycle;

said processor communicating with said system bus and accessing said fast and slow memory with a processor address phase causing a processor generated memory access to be valid on said system bus until receipt of a write cycle complete indication from a memory controller;

said memory controller communicating with said system bus and said slow memory with a memory controller address phase, said memory controller including:

means for receiving said processor generated memory access;

means for supplying a signal to said processor indicative of completion of said write cycle after a first number of clock cycles required to write to said fast memory;

slow memory write detection means for determining if said processor generated memory access is a write to said slow memory and supplying an output signal if yes, said determination of said slow memory write detection means occurring after said memory controller supplies said signal indicative of said write cycle completion to said processor;

memory address phase means responsive to the output of said slow memory write detection means for causing the memory address presented to said fast and slow memory to be valid for a second number of clock cycles required to write to said slow memory, and supplying an indication to said processor instructing said processor to cause the next processor generated access to said fast and slow memory to be valid for said second number of cycles;

wherein said processor has a pipelined architecture and includes means for asserting a next address signal to said processor two clock cycles after commencement of said memory write cycle.

3. The system of claim 2 wherein slow memory write detection means comprises:

a memory configuration register storing fast and slow memory address space and operating parameters;

an address decoder for supplying an output signal indicative of an access to fast or slow memory in response to parameters in said memory configuration register and a memory address supplied from said system bus; and logic means communicating with said system bus for detecting a write cycle.

4. The system of claim 2 wherein said memory address phase means comprises:

a latch for receiving addresses to fast and slow memory from said system bus and providing a latched output of a received address for the duration of a bus cycle;

a multiplexor receiving the output address of said latch and an address from said processor and a control logic output signal that determines which received address is supplied to said multiplexor output, said multiplexor output for addressing said fast and said slow memory;

control logic receiving control signals from said processor indicative of a write to memory and receiving the output signal from said address decoder and supplying a control logic output signal to said multiplexor for causing said multiplexor to output said latched address for at least one clock cycle when said control logic receives a write cycle signal and an access to slow memory signal.

* * * * *